(12) United States Patent
Brown et al.

(10) Patent No.: US 7,966,400 B2
(45) Date of Patent: Jun. 21, 2011

(54) APPARATUS, SYSTEM AND METHOD OF DELIVERING ALTERNATE WEB PAGES BASED ON BROWSERS' CONTENT FILTER SETTINGS

(75) Inventors: Joe Nathan Brown, Austin, TX (US);
Philip Bernard Burkes, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 2591 days.

(21) Appl. No.: 10/406,656

(22) Filed: Apr. 3, 2003

(65) Prior Publication Data
US 2004/0199606 A1    Oct. 7, 2004

(51) Int. Cl.
G06F 7/04      (2006.01)
G06F 15/173    (2006.01)

(52) U.S. Cl. .............. 709/225; 726/2; 726/3; 709/223

(58) Field of Classification Search .......... 709/223–226, 709/246–247; 726/6–7, 2–4, 12–13
See application file for complete search history.

(56) References Cited

U.S. PATENT DOCUMENTS

| | | | |
|---|---|---|---|
| 5,394,551 A * | 2/1995 | Holt et al. ........... | 709/226 |
| 5,996,011 A * | 11/1999 | Humes ................ | 709/225 |
| 6,138,142 A * | 10/2000 | Linsk .................. | 709/203 |
| 6,266,664 B1 * | 7/2001 | Russell-Falla et al. ..... | 707/5 |
| 6,510,458 B1 * | 1/2003 | Berstis et al. ........ | 709/219 |
| 6,564,327 B1 * | 5/2003 | Klensin et al. ........ | 726/7 |
| 6,725,380 B1 * | 4/2004 | Forlenza et al. ....... | 726/6 |
| 6,772,214 B1 * | 8/2004 | McClain et al. ....... | 709/229 |
| 7,016,898 B1 * | 3/2006 | Forlenza et al. ....... | 709/225 |
| 2002/0010757 A1 * | 1/2002 | Granik et al. ......... | 709/218 |
| 2003/0009495 A1 * | 1/2003 | Adjaoute ............. | 707/501.1 |
| 2003/0149745 A1 * | 8/2003 | Dunay et al. ......... | 709/217 |

\* cited by examiner

*Primary Examiner* — Brendan Higa
(74) *Attorney, Agent, or Firm* — Matthew W. Baca; Volel Emile

(57) ABSTRACT

A method, system and apparatus for delivering an alternate Web page to a browser are provided. The method, system and apparatus include the implementation of indicating Web pages that are not authorized to be displayed by the browser using content filter settings, comparing the content filter settings to content labels incorporated in a requested Web page and delivering an alternate Web page, if there is a match. The filter settings are generated by the browser and sent to a server in a request message. The browser also incorporates a semaphore in the request message. The semaphore is used to indicate whether the comparison should be undertaken. Thus, if the semaphore is absent in the request message, the requested Web page is delivered to the browser as customary. Further, in the case where there is a match and there is not an alternate Web page specified, either the requested Web page may be delivered to the browser or a message may be delivered to the browser indicating that the requested web page is off-limit.

16 Claims, 6 Drawing Sheets

US 7,966,400 B2

APPARATUS, SYSTEM AND METHOD OF DELIVERING ALTERNATE WEB PAGES BASED ON BROWSERS' CONTENT FILTER SETTINGS

BACKGROUND OF THE INVENTION

1. Technical Field

The present invention is directed to a communications network. More specifically, the present invention is directed to an apparatus, system and method of delivering alternate Web pages based on browsers' content filter settings.

2. Description of Related Art

Most Web browsers incorporate a Web page content filtering mechanism to prevent certain types of Web pages from being displayed (e.g., Web pages with adult content). When the filter is activated and a user attempts to access a Web site containing one of those Web pages, a message is ordinarily generated to indicate that the user does not have authorization to access the Web page.

This method of filtering Web pages is rather limited since it forecloses all Web pages on a filtered out Web site from being accessed. For example, if a Web site contains sex education material complete with graphic depictions as well as sex education material devoid of those graphic depictions, and if the browser is set to filter out Web sites containing sex education material with those graphic depictions, a user may not be able to view the sex education material that is devoid of the graphic depictions.

Thus what is needed is an apparatus, system and method of delivering alternate Web pages based on browser filter settings.

SUMMARY OF THE INVENTION

The present invention provides a method, system and apparatus for delivering an alternate Web page to a browser. The method, system and apparatus include indicating Web pages that are not authorized to be displayed by the browser using content filter settings, comparing the content filter settings to content labels incorporated in a requested Web page and delivering an alternate Web page, if there is a match. The filter settings are generated by the browser and sent to a server in a request message. The browser also incorporates a semaphore in the request message. The semaphore is used to indicate whether the comparison should be undertaken. Thus, if the semaphore is absent in the request message, the requested Web page may be delivered to the browser as customary. Further, in the case where there is a match and there is not an alternate Web page specified, either the requested Web page or a message may be delivered to the browser indicating that the requested web page is off-limit to the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
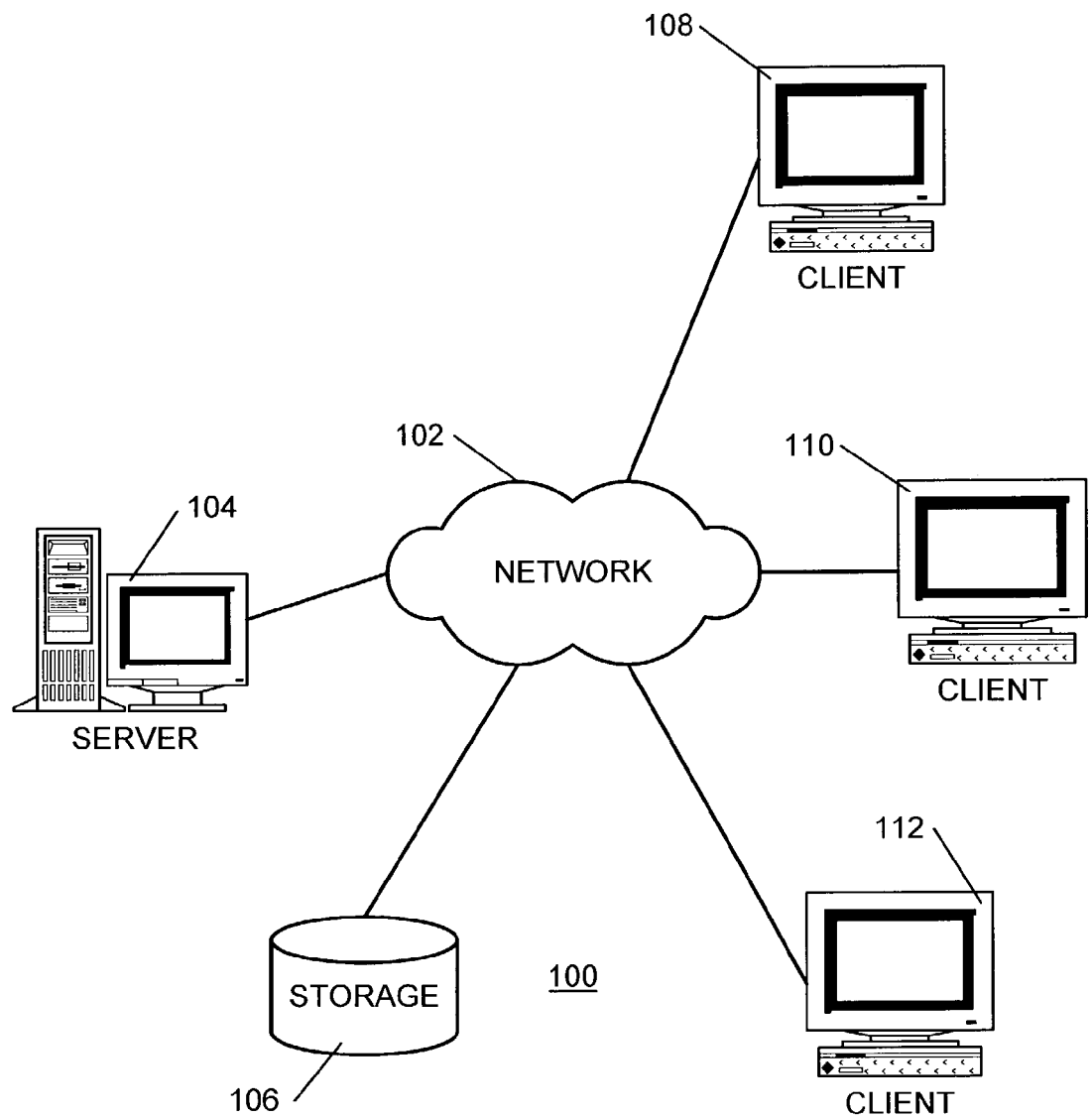
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
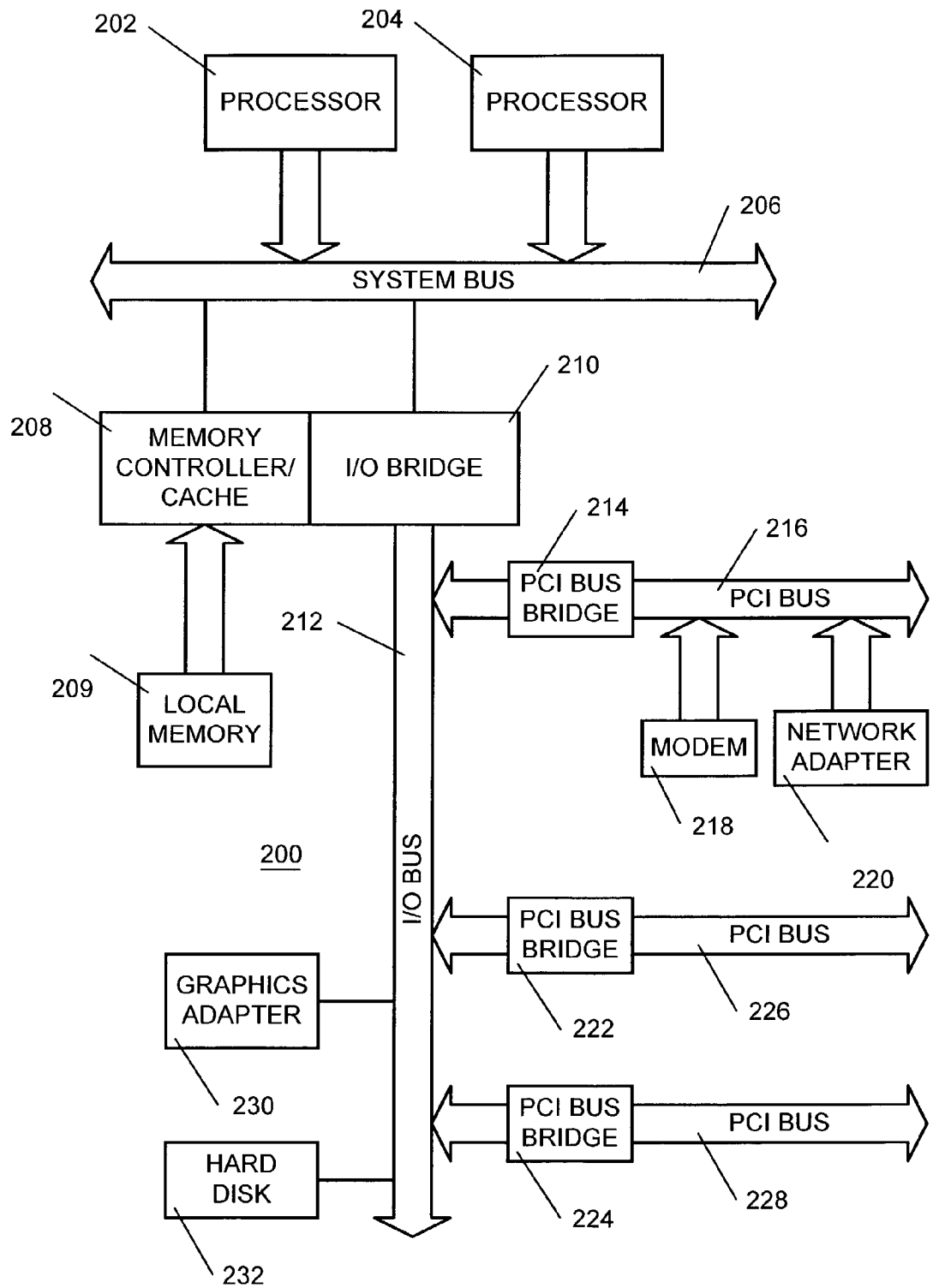
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
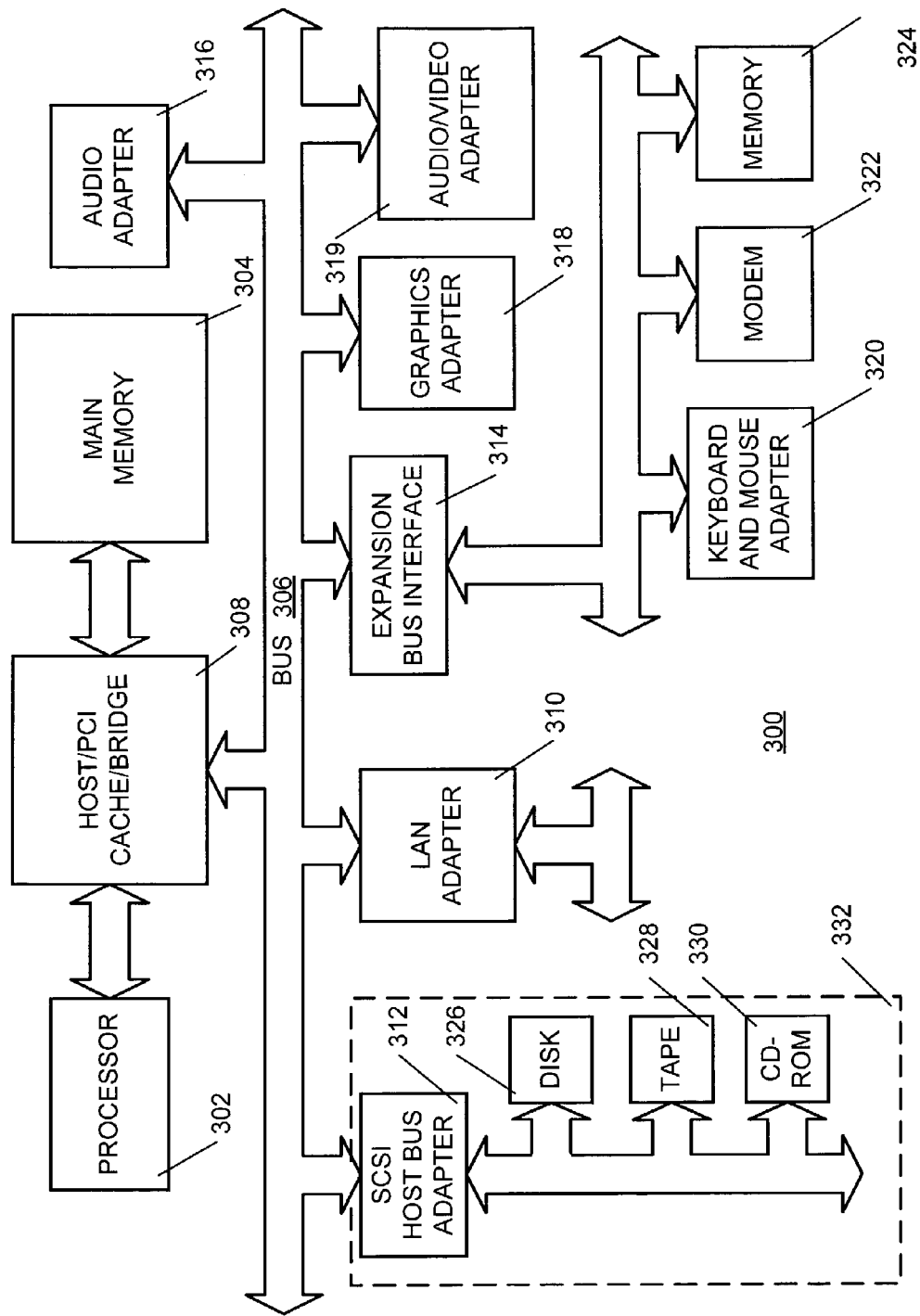
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides an apparatus, system and method of delivering alternate Web pages based on browser filter settings. One part of the invention may be local to any one of client systems 108, 110 and 112 and the other part may be local to server 104 of FIG. 1. Further, the present invention may reside on any data storage medium (i.e., floppy disk, compact disk, hard disk, ROM, RAM, etc.) used by server 104 and the client systems 108, 110 and 112 of FIG. 1.

Most Web browsers (e.g., Microsoft® Internet Explorer, Netscape Navigator) use the Internet Content Rating Association (ICRA) labeling system to filter out Web sites or pages that may contain offensive materials. ICRA is an international, independent, non-profit organization that empowers the public, especially parents, to make informed decisions about electronic media by means of an open and objective labeling system. Specifically, Web authors fill in an on-line questionnaire describing the content of their site, simply in terms of what is and is not present. ICRA then generates a content label (a short piece of computer code) which the author adds to the site. Users, especially parents of young children, can then set their Internet browser to allow or disallow access to web sites based on the objective information declared in the label and the subjective preferences of the user.

In operation, when a browser attempts to access a Web page, the Web page and the added content label are passed to the browser. The browser then compares its filter settings against the content label. If there is a match, the browser may generate a message indicating that the user does not have authorization to view the content of the Web site.

As alluded to before, this method of filtering out Web sites or pages is rather restrictive since Web pages that do not contain offensive materials may not be viewed as well. The present invention uses the ICRA content label system in conjunction with a MIME experimental media type to allow a user to access alternate Web pages on an ICRA labeled Web site.

MIME or Multipurpose Internet Mail Extensions is a specification for formatting non-ASCII messages so that they can be sent over the Internet. As is well known, graphics, audio, and video files etc. are routinely transacted over the Internet. This is made possible by MIME's many predefined content types. An example of a MIME's predefined content type is a GIF graphics file. Another example is a PostScript file. Web browsers as well as HTTP, the main protocol of the World Wide Web (WWW), support various MIME types. This enables the browser to display or output files of varied types.

Figure 4:
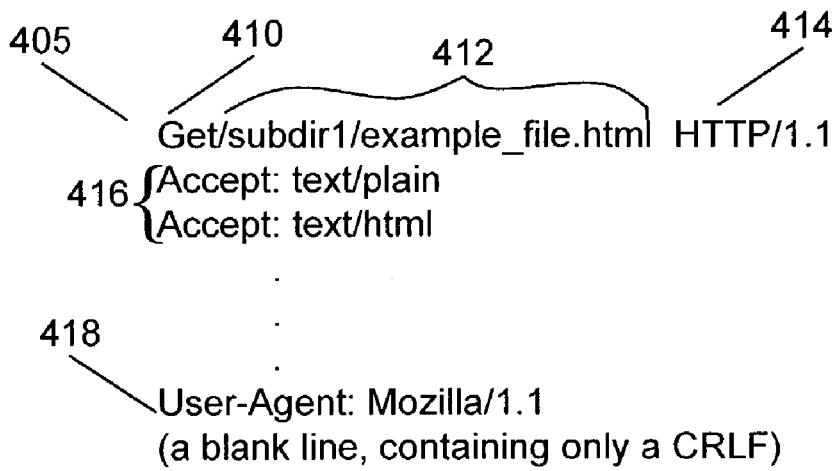
FIG. 4 is a representative request message.

When a browser requests a Web page from a server, the browser generates a request message. The message includes, within the first line, the method to be applied to the resource or the Web page, the identifier of the resource and the protocol version in use. FIG. 4 is a representative request message. The request-line begins with a method token, followed by the request-URI and the protocol version, and ending with CRLF (carriage return and line feed). The elements are separated by SP characters. Each line of the message is terminated with a CRLF. The last line of the message is indicated by a blank line containing only a CRLF.

Thus, on line 405 (i.e., the first line of the request), the method token is "Get" 410, the request-URI is /subdir1/example_file.html 412 which is also the pathname of the file and the protocol version is HTTP/1.1 414. The next two lines 416 in FIG. 4 indicate MIME constructs. For instance, the browser indicates to the server that it will accept plain text as well as html formatted text. After forwarding all pertinent information that the server might need to properly forward the Web page to the browser, the browser identifies itself as Mozilla/ 1.1 (see line 418) which is followed by a CRLF.

Figure 5:
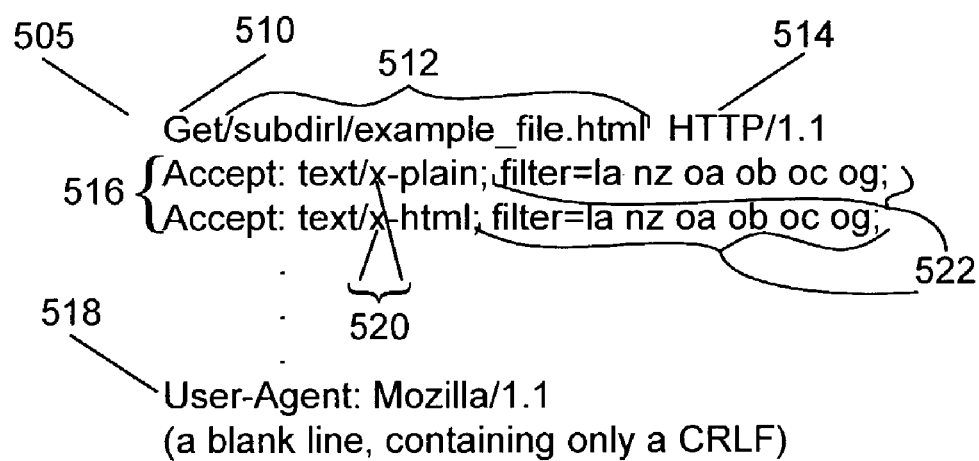
FIG. 5 is a representative request message that may be used by the present invention.

FIG. 5 is a representative request message that may be used by the invention. Items 505, 510, 512, 514, 516 and 518 are identical to items 405, 410, 412, 414, 416 and 418 of FIG. 4. The difference between the items in FIG. 5 and those in FIG. 4 is items 520 and 522. Items 522 define the MIME experimental media type value. The experimental media type value is generally preceded with the characters "x-" which are used as a flag.

Items 522 are the filter settings in the case of a browser configured to filter out certain Web pages. These filter settings will ordinarily coincide with some of the the ICRA content labels. Note that in this case, the filter is set to la, nz, oa, ob, oc and og. These are only exemplary settings and should not be viewed as restrictive. The filter can be set to any of the ICRA content labels.

According to the invention, when the server receives a request message from a browser, it will parse the message for the flag (e.g., "x-"). If it exists, the server will then check to see whether there are filter settings in the message. If so, the server will compare the filter settings to the ICRA content labels of the Web page being accessed. If there is a match, the server will check to see if there is a designated alternate Web page that may instead be passed to the browser. If so, the alternate Web page may be forwarded to the requesting browser. Otherwise, the requested Web page may be passed to the browser as customary and the browser may send the unauthorized notice to the user or the server may generate a message indicating that the Web site is off-limit to the user.

Figure 6:
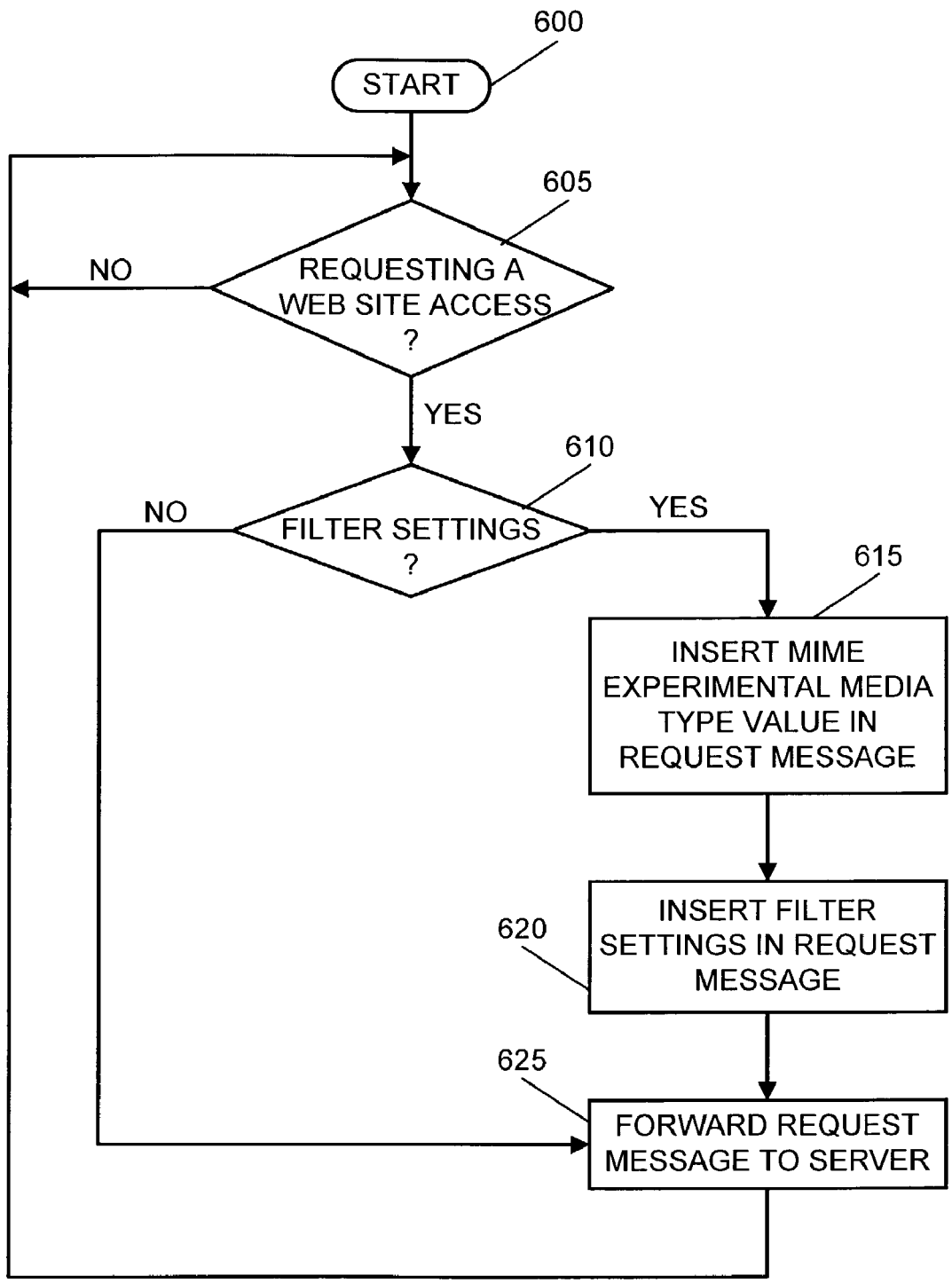
FIG. 6 is a flow chart of a process that may be used by a client system in implementing the invention.

FIG. 6 is a flow chart of a process that may be used by a client system or browser to implement the invention. The process starts when the browser is requesting a Web page from a server (steps 600 and 605). The browser will check to see whether the content filter is set. If so, the browser will insert the flag (e.g., "x-") as well as the filter settings in the request message before passing the message to the server. If the content filer is not set, the browser will forward the request message to the server as customary and the process will return to step 605 (steps 610-625).

Figure 7:
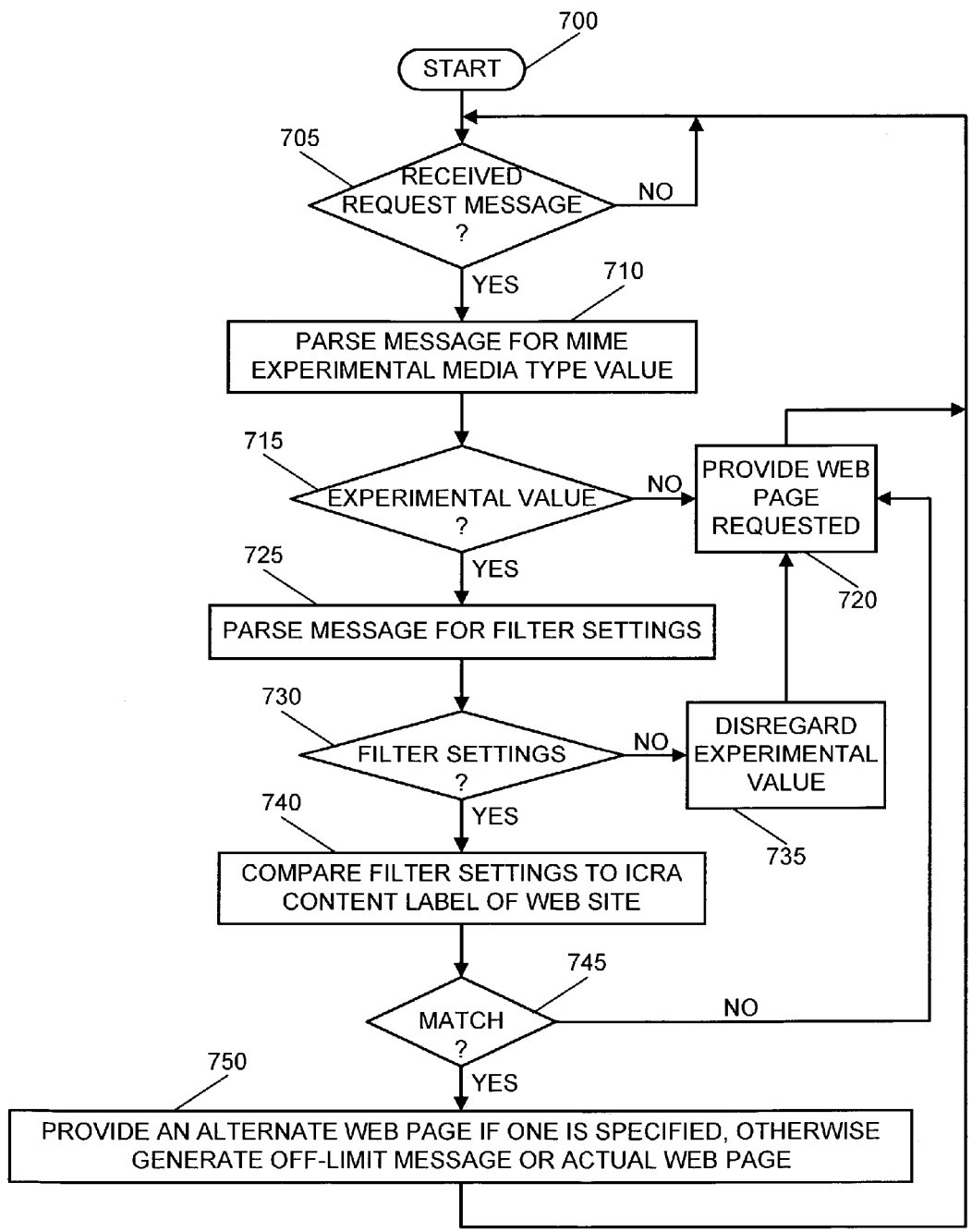
FIG. 7 is a flow chart of a process that may be used by a server in implementing the invention.

FIG. 7 is a flowchart of a process that may be used by a server to implement the invention. The process starts when the server is turned on or is reset (step 700). When the server receives a request message for a Web page from a browser, the server will parse the message for the flag. If there is not one, the server will forward the Web page as customary to the browser and the process will return to step 705 (steps 705, 710 715 and 720).

If there is a flag in the message, the server will then determine whether there are filter settings in the message. If not, the browser may disregard the flag and provide the Web page to the browser and the process will return to step 705 (steps 725, 730, 735 and 720).

If there is a semaphore in the message, the server will then determine whether there are filter settings in the message. If not, the browser may disregard the semaphore and provide the Web page to the browser and the process will return to step 705 (steps 725, 730, 735 and 720).

If there is at least one filter setting in the message, the server will compare the setting to the ICRA content label of the Web site if there is one. If there is a match, the server will forward an alternate Web page to the browser if one is specified. Otherwise, the server will either generate a message indicating that the Web page is off-limit to the user or forward the Web page as customary to the browser. The browser may then generate the non-authorization message to the user and the process will return to step 705 (730, 740, 745 and 750).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of delivering Web pages to a browser comprising the steps of:
    indicating Web pages that are not authorized to be displayed by the browser due to offensive contents using filter settings, wherein the filter settings are generated by the browser and sent to a server in a request for a Web page;
    receiving, at the server, the filter settings in the request;
    determining, at the server, whether there is a flag in the request;
    comparing the filter settings to content labels incorporated in the requested Web page at the server, in response to determining that the flag is in the request;
    determining, at the server, whether there is a match between the filter settings and the content labels; and
    delivering an alternate Web page, in response to determining a match between the filter settings and the content labels, the alternate Web page being a designated Web page that is a version of the requested Web page devoid of the offensive contents when the server contains the designated Web page and the alternate Web page being a page generated by the browser to inform that the requested page cannot be displayed due to the offensive contents when the server does not contain the designated Web page.

2. The method of claim 1, wherein if there is not a flag in the request message, the requested Web page is delivered to the browser as customary.

3. The method of claim 2 wherein if there is a match and there is not an alternate Web page specified, the requested Web page is delivered to the browser as customary.

4. The method of claim 2 wherein if there is a match and there is not an alternate Web page specified, a message is delivered to the browser indicating that the requested web page is off-limit.

5. A computer program product on a non-transitory computer readable medium for delivering Web pages to a browser comprising:
- code for indicating Web pages that are not authorized to be displayed by the browser due to offensive contents using filter settings, wherein the filter settings are generated by the browser and sent to a server in a request for a Web page;
- code for receiving, at the server, the filter settings in the request;
- code for determining, at the server, whether there is a flag in the request;
- code for comparing the filter settings to content labels incorporated in the requested Web page at the server, in response to determining that the flag is in the request;
- code for determining, at the server, whether there is a match between the filter settings and the content labels; and
- code for delivering an alternate Web page, in response to determining a match between the filter settings and the content labels, the alternate Web page being a designated Web page that is a version of the requested Web page devoid of the offensive contents when the server contains the designated Web page and the alternate Web page being a page generated by the browser to inform that the requested page cannot be displayed due to the offensive contents when the server does not contain the designated Web page.

6. The computer program product of claim 5, wherein if there is not a flag in the request message, the requested Web page is delivered to the browser as customary.

7. The computer program product of claim 6 wherein if there is a match and there is not an alternate Web page specified, the requested Web page is delivered to the browser as customary.

8. The computer program product of claim 6 wherein if there is a match and there is not an alternate Web page specified, a message is delivered to the browser indicating that the requested web page is off-limit.

9. An apparatus for delivering Web pages to a browser comprising:
- a processor configured to indicate Web pages that are not authorized to be displayed by the browser due to offensive contents using filter settings, wherein the filter settings are generated by the browser and sent to a server in a request for a Web page;
- an interface configured to receive the filter settings from the browser in the request;
- the processor configured to determine, at the server, whether there is a flag in the request;
- the processor configured to compare the filter settings to content labels incorporated in the requested Web page at the server, in response to determining that the flag is in the request;
- the processor configured to determine, at the server, whether there is a match between the filter settings and the content labels; and
- the processor configured to deliver an alternate Web page, in response to determining a match between the filter settings and the content labels, the alternate Web page being a designated Web page that is a version of the requested Web page devoid of the offensive contents when the server contains the designated Web page and the alternate Web page being a page generated by the browser to inform that the requested page cannot be displayed due to the offensive contents when the server does not contain the designated Web page.

10. The apparatus of claim 9, wherein if there is not a flag in the request message, the requested Web page is delivered to the browser as customary.

11. The apparatus of claim 10 wherein if there is a match and there is not an alternate Web page specified, the requested Web page is delivered to the browser as customary.

12. The apparatus of claim 10 wherein if there is a match and there is not an alternate Web page specified, a message is delivered to the browser indicating that the requested web page is off-limit.

13. A computer system for delivering Web pages to a browser comprising:
- at least one storage system for storing code data; and
- at least one processor for processing the code data to
  - indicate Web pages that are not authorized to be displayed by the browser due to offensive contents using filter settings, wherein the filter settings are generated by the browser and sent to a server in a request for a Web page,
  - receive, at the server, the filter settings in the request,
  - determine, at the server, whether there is a flag in the request,
  - compare the filter settings to content labels incorporated in the requested Web page at the server, in response to determining that the flag is in the request,
  - determine, at the server, whether there is a match between the filter settings and the content labels, and
  - deliver an alternate Web page, if there is a match, the alternate Web page being a designated Web page that is a version of the requested Web page devoid of the offensive contents when the server contains the designated Web page and the alternate Web page being a page generated by the browser to inform that the requested page cannot be displayed due to the offensive contents when the server does not contain the designated Web page.

14. The computer system of claim 13, wherein if there is not a flag in the request message, the requested Web page is delivered to the browser as customary.

15. The computer system of claim 14 wherein if there is a match and there is not an alternate Web page specified, the requested Web page is delivered to the browser as customary.

16. The computer system of claim 14 wherein if there is a match and there is not an alternate Web page specified, a message is delivered to the browser indicating that the requested web page is off-limit.

* * * * *